(12) United States Patent
Shima (10) Patent No.: US 7,429,947 B2
(45) Date of Patent: Sep. 30, 2008

(54) RADAR APPARATUS FOR DETECTING DISTANCE OR VELOCITY WITH RESPECT TO AN OBJECT

(75) Inventor: Nobukazu Shima, Kobe (JP)

(73) Assignee: Fujitsu Ten Limited, Hyogo (JP)

( * ) Notice: Subject to any disclaimer, the term of this patent is extended or adjusted under 35 U.S.C. 154(b) by 84 days.

(21) Appl. No.: 10/596,096

(22) PCT Filed: Jun. 15, 2005

(86) PCT No.: PCT/JP2005/011402

§ 371 (c)(1),
(2), (4) Date: May 30, 2006

(87) PCT Pub. No.: WO2005/124388

PCT Pub. Date: Dec. 29, 2005

(65) Prior Publication Data

US 2007/0052581 A1    Mar. 8, 2007

(30) Foreign Application Priority Data

Jun. 21, 2004    (JP) .............................. 2004-182352

(51) Int. Cl.
*G01S 7/40* (2006.01)

(52) U.S. Cl. ..................................... 342/174; 342/173

(58) Field of Classification Search ................. 342/173, 342/174, 109
See application file for complete search history.

(56) References Cited

U.S. PATENT DOCUMENTS

| 5,610,680 | A | 3/1997 | Seki et al. |
| 5,864,314 | A | 1/1999 | Ashihara |
| 5,940,029 | A | 8/1999 | Ninomiya et al. |
| 6,335,700 | B1 | 1/2002 | Ashihara |
| 6,445,339 | B1 | 9/2002 | Yamada |
| 2007/0052581 | A1* | 3/2007 | Shima ........................ 342/173 |

FOREIGN PATENT DOCUMENTS

| EP | 0801120 | 10/1997 |
| EP | 0898174 | 2/1999 |
| EP | 0919828 | 6/1999 |
| EP | 0959522 | 11/1999 |
| EP | 1076244 | 2/2001 |
| GB | 2256948 | 12/1992 |

(Continued)

*Primary Examiner*—Dan Pihulic
(74) *Attorney, Agent, or Firm*—Fogg & Powers LLC; Gregory M. Taylor (57) ABSTRACT

A radar apparatus includes a plurality of receiver circuit systems to correspond with a plurality of receiving antennas. Channel signals having the same characteristics are generated by the switching operation of a second switch from a received channel signal received by an antenna selected by a first switch, and the thus generated signals are input to the respective receiver circuit systems. Any change in characteristic is detected by comparing signal level and phase between the channel signals converted from analog to digital. The characteristic of each receiver circuit system or the characteristic of each A-D converted output signal is corrected based on the result of the detection of each receiver circuit system. Any change detected in the characteristic of a receiver circuit system is corrected during normal operation, and any change occurring in the characteristic due to aging or temperature variations in the operating environment is corrected as needed.

17 Claims, 6 Drawing Sheets

FOREIGN PATENT DOCUMENTS

| | | |
|---|---|---|
| JP | 08043080 A | 2/1996 |
| JP | 09221372 | 8/1997 |
| JP | 10118584 | 5/1998 |
| JP | 11064485 A | 3/1999 |
| JP | 11311668 A | 11/1999 |
| JP | 2000227474 A | 8/2000 |
| JP | 2001166029 A | 6/2001 |
| JP | 2002162460 A | 6/2002 |
| JP | 2004153606 A | 5/2004 |

* cited by examiner

RADAR APPARATUS FOR DETECTING DISTANCE OR VELOCITY WITH RESPECT TO AN OBJECT

This application claims the priority under 35 U.S.C. 371 of prior PCT application PCT/JP2005/011402, filed Jun. 15, 2005, which in turn claims the priority of prior Japanese application 2004-182352, filed Jun. 21, 2004, both of which are incorporated herein in their entirety by reference.

TECHNICAL FIELD

The present invention relates to an FM-CW radar apparatus that uses a frequency-modulated (FM) continuous wave (CW) as a signal for transmission, and more particularly to an electronic scanning radar apparatus that is equipped with a plurality of antennas switchable to receive a transmitter signal returning back as a reflected wave, and that performs digital beam forming (DBF).

DESCRIPTION OF THE RELATED ART

A prior art DBF radar apparatus comprises a transmitter section which radiates a transmitter signal as an electromagnetic wave, and an array antenna having a plurality of antenna elements which receives, as a received signal, the electromagnetic wave reflected off an object. The antenna elements are each connected to one of a plurality of input terminals of a selector switch, and the plurality of input terminals are selectively connected one at a time to an output terminal of the selector switch. The incoming signal received by the selected antenna and supplied via the output terminal is downconverted by using a portion of the transmitter signal, to generate a difference signal representing the difference between the transmitter signal and the received signal; then, in a signal processing unit of a receiver, the difference signal is converted into a digital signal, and prescribed processing is applied to the digital signal thereby detecting the distance to or the relative velocity of the object. Such a radar apparatus is disclosed, for example, in Japanese Unexamined Publication No. H11-160423.

Further, as disclosed, for example, in Japanese Unexamined Publication No. H11-64485, there has been developed an array antenna radar apparatus in which a single front end is provided in common to all the antennas with provisions made to sequentially couple the antennas to the front end by direct connection, thereby eliminating the need to provide a radio-frequency (RF) receiver circuit for each antenna.

On the other hand, there is disclosed, for example, in Japanese Unexamined Publication No. H11-311668, an FM-CW radar apparatus which comprises a transmitter unit, an array antenna unit, a selector switch unit, a receiver circuit unit, and a digital signal processing unit, and in which the antennas in the array antenna unit are sequentially switched in for connection and the digital signal processing unit performs digital beam forming for detection of a target object. In this radar apparatus, the selector switch unit selectively connects the antennas one at a time to the receiver unit in which a beam signal is produced; here, in each repetition period of frequency modulation, some of the plurality of antennas are selected, and the selective switching is repeated among the selected antennas. With this configuration, only one set of expensive devices, such as an RF receiver circuit, a high-band mixer, an analog-digital (AD) converter, etc., need be provided, regardless of the number of antennas.

In the FM-CW radar apparatus according to the prior art described above, as an electronic scanning method is employed that detects the phase difference between the received signals by performing DBF while sequentially switching from one antenna to another, if any component failure or any change in characteristics due to temperature variations in the operating environment occurs in the receiver circuit unit, a fault will occur in the detection of the phase difference of the received signals.

However, the FM-CW radar apparatus according to the prior art disclosed in the above-cited Japanese Unexamined Publication No. H11-311668 is equipped with only one receiver circuit unit containing an RF receiver circuit, a high-band mixer, an AD converter, etc. As the received signals are processed in this receiver circuit unit, there has been the problem that even when a change has occurred in the characteristics of the receiver circuit unit as described above, it is not possible to know from its processing result whether there is an error in the detection of the phase difference.

In view of this, it is an object of the present invention to provide a radar apparatus that can self-diagnose changes in the characteristics of the receiver circuit unit by using the receiver circuit unit itself, and that, if it is determined as a result of the self-diagnosis that a change has occurred in the characteristics of the receiver circuit unit, can correct the characteristics accordingly and also can output diagnostic information, etc. in the event of the occurrence of a fault.

DISCLOSURE OF THE INVENTION

To solve the above problem, a radar apparatus according to the present invention comprises: a transmitter unit which radiates a transmitter signal; a plurality of antennas each of which receives a reflected wave produced by a reflection of the transmitter signal off an object; a first switch unit which connects output terminals of the plurality of antennas in sequence and one at a time to an input terminal; a downconverting unit which, by using a portion of the transmitter signal, downconverts a received signal input from the antenna connected to the input terminal of the first switch unit; a second switch unit which connects an output of the downconverting unit to a selected one of first to nth filter circuits; a digital signal processing unit which takes outputs of the first to nth filter circuits for input to first to nth AD converters, and which applies prescribed processing to first to nth output signals output from the first to nth AD converters and thereby detects distance or relative velocity with respect to the object; and a signal characteristic checking unit which compares two output signals selected from among the first to nth output signals that were output based on the received signal received by a particular antenna selected from among the plurality of antennas, and thereby checks for a change in the characteristics of the first to nth output signals and corrects for any difference in the characteristics.

Here, the signal characteristic checking unit checks for a change in the characteristics of the first to nth output signals by comparing signal level and/or phase between the two output signals respectively selected from among first to nth output signals.

The signal characteristic checking unit selects the particular antenna from among the plurality of antennas by controlling the first switch and, from the received signal received by the particular antenna, generates the first to nth output signals by controlling the second switch; then, when it is determined that there is a difference in the characteristics, the signal characteristic checking unit corrects for the difference in the characteristics by controlling first to nth adjusters respectively connected to inputs of the first to nth AD converters.

Here, the first to nth adjusters each include a variable-gain amplifier and/or a variable phase shifter which are controlled by the signal characteristic checking unit.

Further, when it is determined that there is a difference in the characteristics, the signal characteristic checking unit calculates a correction value for the first to nth output signals in accordance with the difference in the characteristics, and the digital signal processing unit corrects the first to nth output signals based on the correction value.

The signal characteristic checking unit performs processing to check for a change in the characteristics in an intermittent manner during a recognition process in which the digital signal processing unit detects the distance or relative velocity with respect to the object.

Here, the signal characteristic checking unit performs processing to check for a change in the characteristics when it is recognized that the distance relative to the object remains unchanged; in particular, the signal characteristic checking unit performs processing to check for a change in the characteristics when it is recognized that a vehicle equipped with the apparatus is stationary.

The signal characteristic checking unit performs processing to check for a change in the characteristics when the signal level and/or phase of the first to nth output signals is greater than a predetermined value or lies within a predetermined range; further, the signal characteristic checking unit stores the calculated correction value in association with the first to nth output signals, and the recognition process is performed based on the first to nth output signals corrected by the correction value.

The signal characteristic checking unit performs processing to check for a change in the characteristics of the first to nth output signals in accordance with an external instruction; further, the signal characteristic checking unit performs processing to check for a change in the characteristics as an initial adjustment of the apparatus and, if there is a change in the characteristics, it then stores the calculated correction value in association with the first to nth output signals.

The signal characteristic checking unit produces a notification externally when it is determined that a change has occurred in the characteristics; further, when it is determined that a change has occurred in the characteristics, if the change in the characteristics is not within a predetermined range, the signal characteristic checking unit outputs diagnostic information externally.

As described above, according to the radar apparatus of the present invention, there is no need to provide special correction equipment, and besides, any changes which may exist or which have occurred in the characteristics of each receiver circuit system comprising a filter circuit and an AD converter for processing the received signal received by the antenna can be detected accurately and quickly even during normal operation, and a correction can be applied to the receiver circuit system in accordance with the result of the detection; accordingly, variations in received signal characteristics due to differences in processing performance between the receiver circuit systems can be easily corrected in an initial adjustment procedure performed at the factory before shipment, and furthermore, corrections can even be made as needed for temperature variations due to environmental changes during operation, thereby ensuring high accuracy at all times.

Furthermore, according to the radar apparatus of the present invention, if, initially, there exists a performance difference between the plurality of receiver circuit systems provided to correspond with the plurality of receiving antennas, or if the characteristics degrade due to aging of the receiver circuit systems, or a fault occurs in any one of the receiver circuit systems during the operation of the radar apparatus, corrections can be made in accordance with the change or difference in the characteristics due to the fault, etc.; in this way, the accuracy of the recognition operation of the radar apparatus can be maintained at a high level at all times.

BRIEF DESCRIPTION OF THE DRAWINGS

The present invention will be described below with reference to the accompanying drawings, wherein.

EMBODIMENTS OF THE INVENTION

Next, embodiments of a radar apparatus according to the present invention will be described, but before proceeding to the description of the embodiments, an electronic scanning radar apparatus which performs digital beam forming (DBF), and which forms the basis of the radar apparatus of the present embodiment, will first be described in order to clarify the effect that the present invention offers.

An FM-CW radar apparatus transmits a continuous wave frequency-modulated, for example, in a triangular pattern toward a target such as a vehicle traveling ahead, and measures, for example, the distance to the vehicle ahead by receiving the transmitted wave returning back as a reflected wave. More specifically, the transmitted wave from the radar apparatus is reflected by the vehicle ahead, and the reflected wave is received as the received signal which is then mixed with the transmitted signal to produce a beat signal (radar signal). This beat signal is fast Fourier transformed to analyze the frequency. As the frequency-analyzed beat signal exhibits a peak at which power becomes large corresponding to the target, the peak frequency corresponding to this peak is acquired.

This peak frequency carries information about the distance, and the peak frequency differs between the UP section and DOWN section of the triangular FM-CW wave due to the Doppler effect associated with the relative velocity with respect to the vehicle ahead. The distance and relative velocity with respect to the vehicle ahead are obtained from the peak frequencies in the UP and DOWN sections. When there is more than one vehicle traveling ahead, a pair of peak frequencies in the UP and DOWN sections is acquired for each vehicle by performing a process called pairing.

In the FM-CW radar apparatus that can detect the distance and the relative velocity as described above, a modulating signal generator applies a modulating signal to a voltage-controlled oscillator for frequency modulation, and the resulting frequency-modulated wave is transmitted out as a transmitter signal from a transmitting antenna while, at the same time, a portion of the transmitter signal is separated and fed into a mixer which functions as a downconverter. On the other hand, the wave reflected from a target object is received by a receiving antenna, and the received signal is mixed in the mixer with the output signal of the voltage-controlled oscillator to produce a beat signal. The beat signal is passed through a band-pass filter circuit and fed into an AD converter for digital sampling; the digital signal thus obtained is then supplied to a digital signal processing unit where signal processing, such as a fast Fourier transform, is applied to the digital signal to obtain the distance and the relative velocity.

In digital beam forming (DBF), signals received by an array antenna having a plurality of receiving antennas are each A/D converted and fed into a digital signal processing unit, and adjustments of beam scanning and sidelobe characteristics, etc. are made in the digital signal processing unit.

A radar apparatus that employs DBF implements the functions of the phase shifters of a phased-array antenna radar by digital signal processing. In the DBF radar apparatus, a modulating signal generator applies a modulating signal to a voltage-controlled oscillator for frequency modulation, and the resulting frequency-modulated wave is transmitted out as a transmitter signal from a transmitting antenna, while at the same time, a portion of the transmitter signal is separated and fed into a plurality of mixers the number of which corresponds to the number of receiving antennas. On the other hand, waves reflected from an object are received by the plurality of receiving antennas, and the received signals from the respective receiving antennas are fed via respective amplifiers into the plurality of mixers where the received signals are each mixed with the output signal of the voltage-controlled oscillator to produce beat signals.

The beat signals thus produced are passed through respective band-pass filter circuits and are converted by respective A/D converters into digital signals which are supplied to a digital signal processing unit. In the digital signal processing unit (DSP), phase shifting is applied to the digital signal from each channel, and all the channels are combined, thus forming multiple beams.

The feature of DBF is that a plurality of beams can be formed in a single acquisition process because, once the signals from all the receiving antennas are taken in as digital signals, the beams can be synthesized in any desired directions based on the digital signals.

Figure 1:
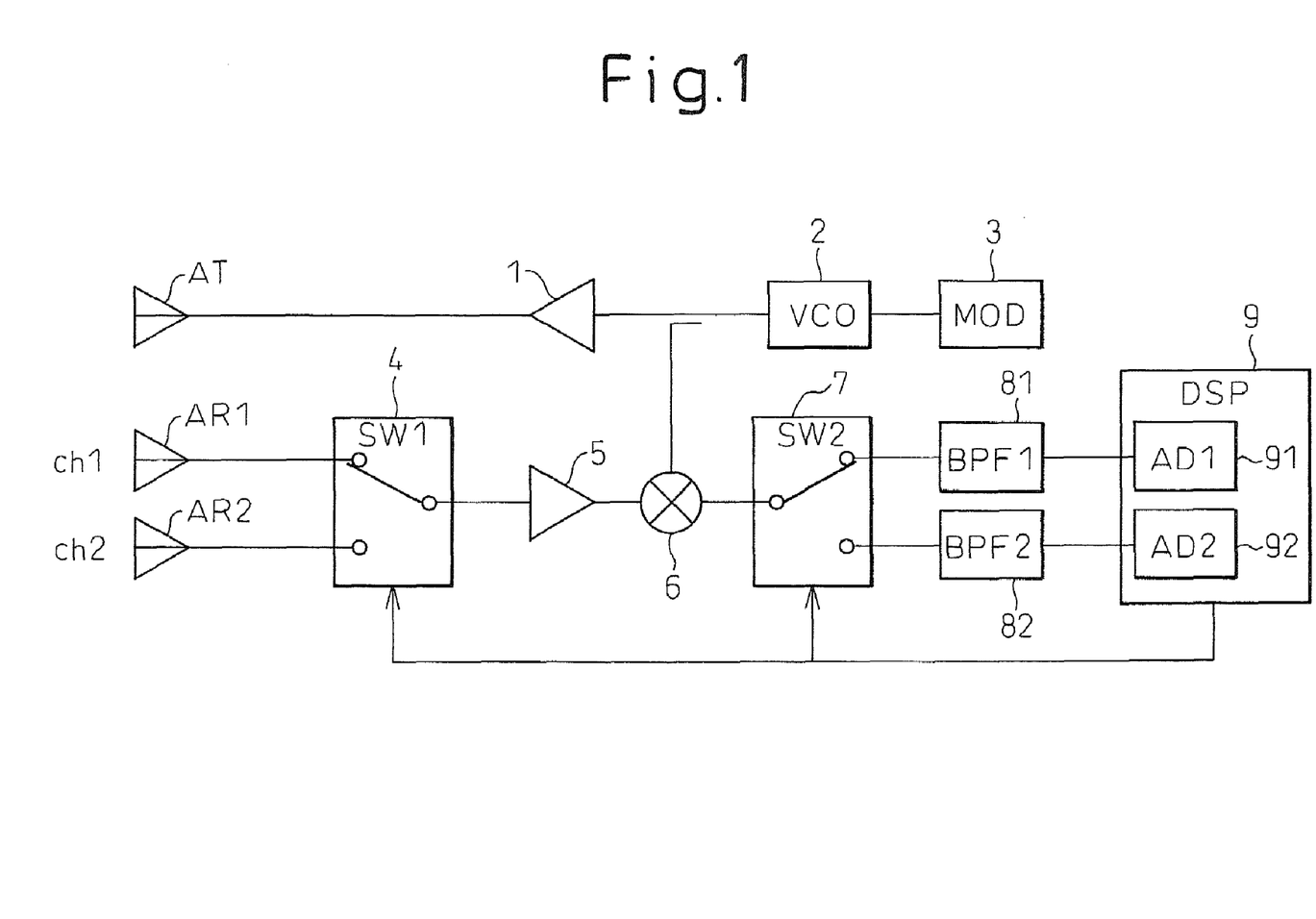
FIG. 1 is a diagram for explaining the basic configuration of an FM-CW radar apparatus that performs digital beam forming.

A specific example as a modification of such a DBF FM-CW radar apparatus is shown in FIG. 1. The radar apparatus configuration shown in FIG. 1 forms the basis for the radar apparatus of the present embodiment. This radar apparatus is equipped with an array antenna having a plurality of antennas, which in the example of FIG. 1, includes a transmitting antenna AT and receiving antennas AR1 and AR2. The transmitting antenna AT, together with an amplifier 1, a voltage-controlled oscillator 2 designated as VCO, and a modulating signal generator 3 designated as MOD, constitutes the transmitter unit.

The radar apparatus further comprises: a first switch 4, designated as SW1, for selectively connecting the receiving antennas AR1 and AR2 one at a time to an amplifier 5; a mixer 6 for mixing the received signal with a portion of the transmitter signal; a second switch 7, designated as SW2, for directing the mixed signal to a selected one of band-pass filter circuits 81 and 82 designated as BP1 and BP2, respectively; and AD converters 91 and 92, designated as AD1 and AD2, to which the outputs of the respective band-pass filters 81 and 82 are coupled, the AD converters 91 and 92 being contained in a digital signal processing unit 9 designated DSP.

The amplifier 5 and the mixer 6 together constitute the downconverting unit, and the band-pass filters 81 and 82 and the AD converters 91 and 92 together constitute the receiver circuit unit. In the example of the radar apparatus shown in FIG. 1, the number of receiving antennas is two, and accordingly, two receiver circuit systems each comprising one band-pass filter circuit paired with one AD converter are provided to correspond with the two antennas. FIG. 1 shows the configuration equipped with two receiving antennas as a representative example, but generally, in the receiver circuit unit, a plurality of receiver circuit systems each comprising one band-pass filter circuit paired with one AD converter are provided to correspond with the number of receiving antennas, and these receiver circuit systems are selectively switched into connection one at a time by the second switch.

In the thus constructed radar apparatus, the modulating signal generated by the modulating signal generator 3 is applied to the output signal of the voltage-controlled oscillator 3 to generate a frequency-modulated signal, and this frequency-modulated signal is transmitted as a transmitter signal from the transmitting antenna AT. At the same time, a portion of the transmitter signal is separated and fed into the mixer 6 in the downconverting unit. On the other hand, reflected waves resulting from the transmitter signal reflected off an object are received as received signals by the plurality of receiving antennas AR1 and AR2. Here, the signal paths of the receiving antennas AR1 and AR2 are designated as channels ch1 and ch2, respectively. The output terminals of the plurality of receiving antennas AR1 and AR2 are sequentially selected by the first switch 4 and connected one at a time to the input terminal of the mixer 6 in the downconverting unit via the amplifier 5, the signal to be input to the downconverting unit thus being switched between the channels ch1 and ch2.

This switching operation is controlled by a signal output from a switching signal generator contained in the digital signal processing unit 9. This switching signal is a clock signal of prescribed frequency, and channel switching occurs at each of the rising and falling edges of the switching signal with the prescribed frequency, thus switching between the received signals of channels ch1 and ch2. As a result, during one prescribed period of the clock signal, the channel ch1 is connected to the amplifier 5 and, during the next prescribed period, the channel ch2 is connected to the amplifier 5. Thereafter, the channels ch1 and ch2 are alternately connected to the amplifier 5 in like manner, i.e., one channel at a time during each prescribed period. In this way, the channels are switched from one to the other at prescribed intervals of time.

The received signal amplified by the amplifier 5 is fed into the mixer 6 in the downconverting unit where the received signal is mixed with the transmitter signal output from the voltage-controlled oscillator 2 and is thus downconverted to produce the beat signal. The beat signal is output to the second switch 7. The second switch 7 switches the beat signal alternately between the two channels comprising the band-pass filter circuits 81 and 82 and the AD converters 91 and 92, respectively. This switching operation is controlled by the signal output from the switching signal generator contained in the digital signal processing unit 9, and is performed at the above prescribed frequency synchronously with the antenna switching operation of the first switch 4.

The band-pass filter circuits 81 and 82 are connected to the AD converters 91 and 92, respectively; the signals input to the respective band-pass filter circuits 81 and 82 are converted into digital signals by the respective AD converters 91 and 92, and signal processing, such as fast Fourier transform, is applied to the digital signals in the digital signal processing unit 9. Then, phase shifting is applied to the digital signal from each channel, and all the channels are combined, to measure the distance and the relative velocity.

In the radar apparatus shown in FIG. 1, the number of band-pass filter circuits is made equal to the number of receiving antennas, but the number of band-pass filter circuits may be made smaller than the number of receiving antennas. However, there must be at least as many band-pass filter circuits as the number of receiving antennas that need to be switched simultaneously. For example, if the number of receiving antennas that are switched synchronously is two, then two band-pass filter circuits will suffice.

Further, in FIG. 1, more than one AD converter is provided, but alternatively, a third selector switch may be inserted separately and the number of AD converters may be reduced to one by making provisions so that the plurality of band-pass filter circuits are selectively switched in by the third selector switch for connection to the AD converter. In this case, the switching operation of the third selector switch is controlled by the signal output from the switching signal generator 5 in the digital signal processing unit 9, and is performed synchronously with the receiving antenna switching operation.

Figure 2:
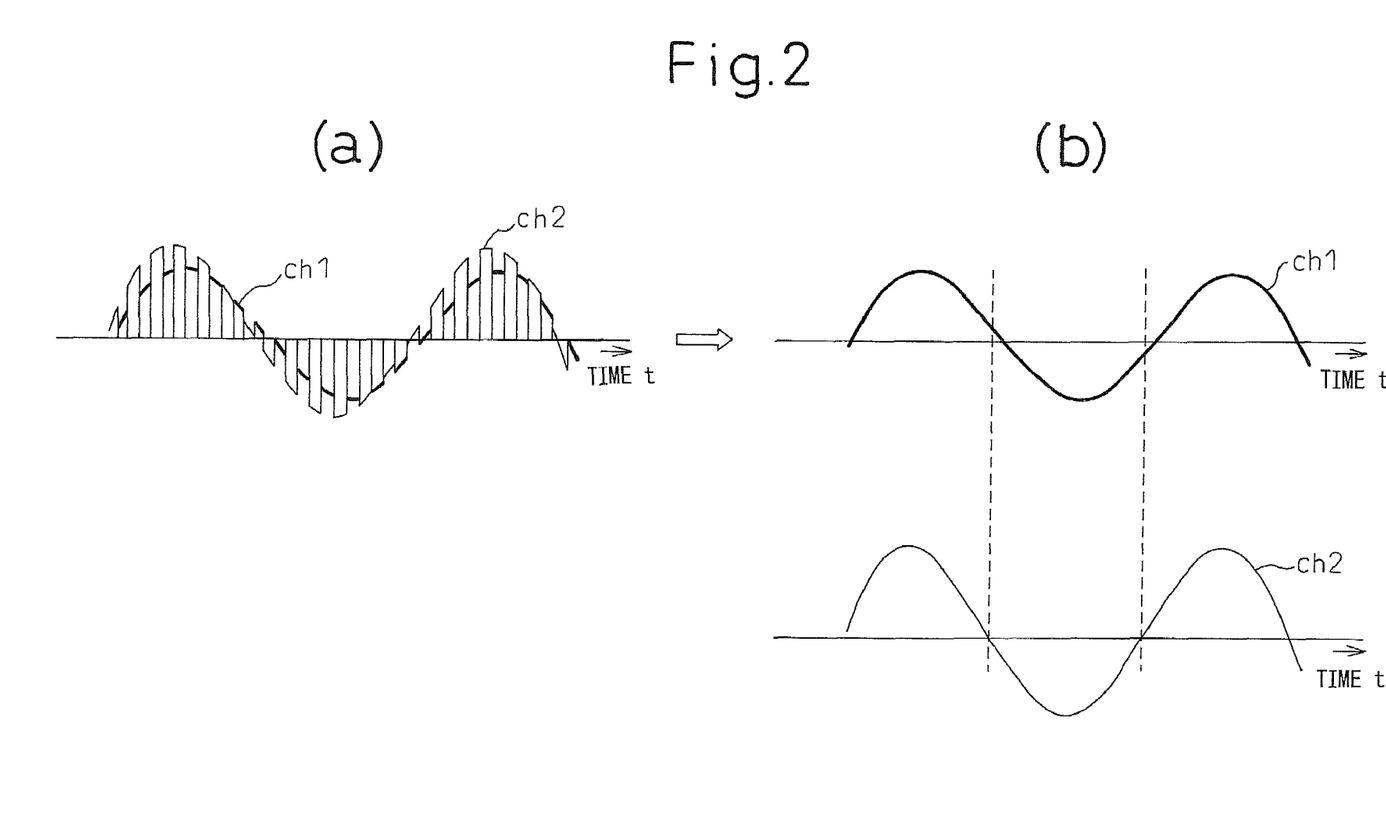
FIG. 2 is a waveform diagram for explaining the difference in output signal characteristics between two receiver circuit systems after downconverting in the radar apparatus shown in FIG. 1.

As shown in FIG. 1, in the DBF FM-CW radar apparatus so far proposed, the receiver circuit unit includes as many receiver circuit systems, each comprising one band-pass filter circuit paired with one AD converter, as there are receiving antennas. FIG. 2 shows an input waveform to the receiver circuit unit and an input waveform to the AD converter in the receiver circuit unit during a recognition process being performed by the radar apparatus to detect distance and relative velocity. Part (a) of FIG. 2 shows the waveform of the signal that was input to the downconverting unit by switching between the channels ch1 and ch2 via the first switch 4 and output from it, and part (b) of FIG. 2 shows the waveform of the signal that was input to the band-pass filter circuit 81 or 82 by the switching operation of the second switch 7 and processed by the filter circuit for input to the AD converter 91 or 92.

Here, if the two receiver circuit systems constituting the receiver circuit unit have the same characteristics, as the receiving antennas AR1 and AR2 also have the same characteristics, the waveforms of the signals on the channels ch1 and ch2 at the output of the downconverting unit should be identical in shape but shifted in time by an amount equivalent to the switching frequency of the first switch 4. However, if the characteristics differ between the receiving antennas, for example, the waveforms of the downconverted signals on the channels ch1 and ch2 at the input of the SPDT are also different in shape, as shown in part (a) of FIG. 2.

When the waveforms of the channel signals ch1 and ch2 input to the SPDT are different in shape, as shown in part (a) of FIG. 2, then the waveforms of the channel signals ch1 and ch2 filtered through the band-pass filter circuits 81 and 82 and input to the AD converters 91 and 92 are also different in shape, as shown in part (b) of FIG. 2. As can be seen, the channel signal ch1 is smaller in amplitude than the channel signal ch2, and the gain of the channel signal ch1 is therefore lower; furthermore, the channel signals ch1 and ch2 are shifted in phase relative to each other. If azimuth detection is performed based on these channel signals ch1 and ch2, a fault will occur in the azimuth detection during the recognition process because of differences in signal level and phase between the two waveforms.

FIG. 2 has explained the case where there is a difference in characteristics between the receiving antennas, but in the configuration comprising the plurality of receiver circuit systems, even when there is no difference in characteristics between the receiving antennas, a phenomenon similar to that shown in part (b) of FIG. 2 can occur between the channel signals processed by the respective receiver circuit systems, if there is a difference in characteristics between the plurality of receiver circuit systems. When more than one receiver circuit system is provided, a fault can occur in azimuth detection in such cases as 1) when the gain and/or phase of each receiver circuit system is not adjusted, for example, at the time of manufacture, 2) when variations occur in the gain and/or phase of each receiver circuit system due to variations in the operating environment of the radar apparatus, or 3) when abnormality such as failure has occurred in a particular receiver circuit system.

In view of this, in the radar apparatus of the present embodiment, by applying corrections to eliminate any difference in characteristics between the plurality of receiver circuit systems that can affect the accuracy of azimuth detection, it is made possible to eliminate the effects that a change or variation in the characteristics of each receiver circuit system may have on the recognition process. For this purpose, in the radar apparatus of the present embodiment, utilizing the plurality of receiver circuit systems provided in the radar apparatus, self-diagnosis is performed by supplying a channel signal common to all the receiver circuit systems and thereby detecting any difference in characteristics between the receiver circuit systems and checking for a fault in the receiver circuit systems based on the difference.

As a method of supplying the channel signal common to all the receiver circuit systems, the first switch 4 and the second switch are controlled so as to select a particular one of the plurality of receiving antennas and to supply the signal received by the particular antenna to each receiver circuit system. During the usual recognition process, the first switch 4 and the second switch 7 are operating in synchronized fashion to connect the corresponding receiving antenna and receiver circuit system, but during the self-diagnosis for fault testing of the receiver circuit systems, the first switch 4 is controlled so as to connect fixedly only to the particular antenna, while the second switch 7 is controlled so as to select two receiver circuit systems from among the plurality of receiver circuit systems and to switch its output between the two receiver circuit systems. In this way, control is performed so that the channel signal relating to the signal received by the particular antenna is supplied to each of the selected receiver circuit systems.

Figure 3:
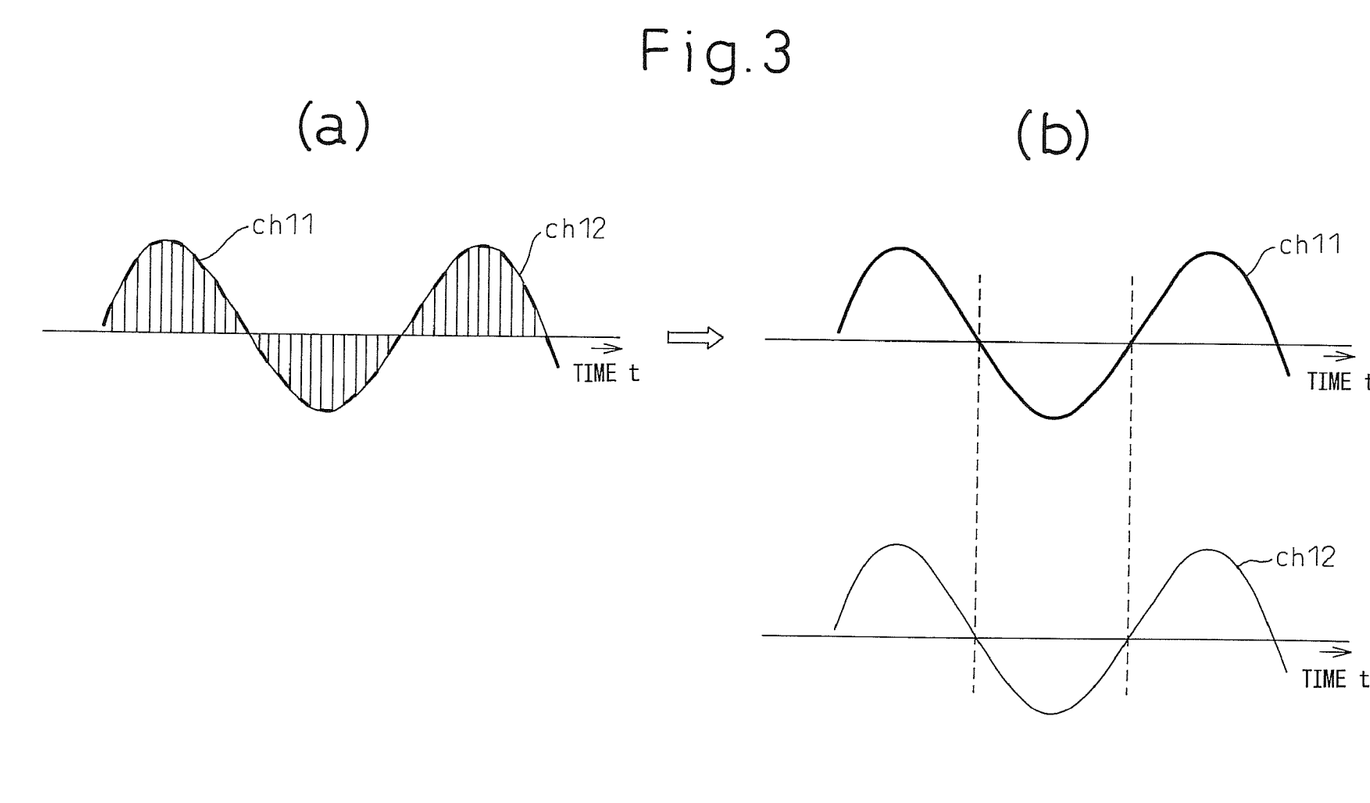
FIG. 3 is a waveform diagram for explaining the principle for correcting the difference in output signal characteristics between the two receiver circuit systems after downconverting in the FM-CW radar apparatus.

The basic principle of the self-diagnosis for fault testing of the receiver circuit systems is shown in FIG. 3, illustrating the waveforms of the channel signals, by taking the radar apparatus of FIG. 1 as an example. Part (a) of FIG. 3 shows the waveform of the signal output from the second switch 7. At this time, the receiving antenna AR1 is selected as the particular antenna by the first switch 4. The receiving antenna AR1 receives the reflected wave resulting from a reflection of the transmitter signal transmitted from the transmitting antenna AT. Based on this received signal, a beat signal is produced in the downconverting unit. The beat signal is switched by the second switch 7 from one channel to the other at the same switching frequency as that in the usual recognition process, to generate channel signals ch11 and ch12.

The channel signal ch11, indicated by a thick line, and the channel signal ch12, indicated by a thin line, appear alternately at the switching frequency, and the envelope of these signals defines the beat signal. The channel signal ch11 is fed to the band-pass filter circuit 81, and the channel signal ch12 to the band-pass filter circuit 82.

Part (b) of FIG. 3 shows the waveforms output from the respective band-pass filter circuits for input to the respective AD converters 91 and 92. The waveform of the input signal to the AD converter 91 is represented by the channel signal ch11, while the waveform of the input signal to the AD converter 92 is represented by the channel signal ch12. As can be seen from the waveforms shown in part (b) of FIG. 3, when the characteristics of the selected two receiver circuit systems are the same, the waveforms of the channel signals ch11 and ch12 are also the same, but if the characteristics differ between the receiver circuit systems, the signal waveforms differ in amplitude and/or phase. Accordingly, by detecting a difference in signal level and/or phase between the channel signals ch11 and ch12, the difference in characteristics between the receiver circuit systems can be self-diagnosed.

Figure 4:
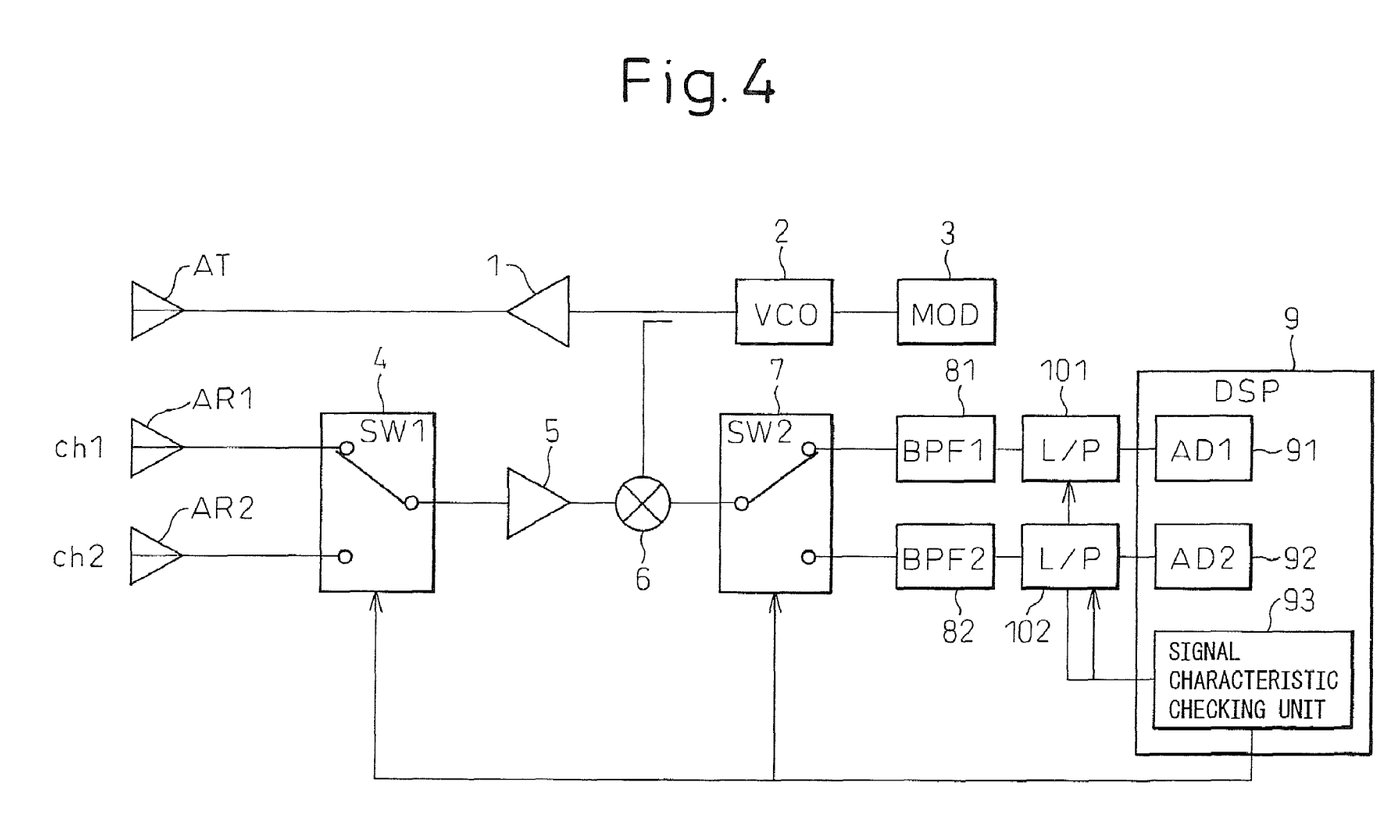
FIG. 4 is a diagram for explaining the configuration of a radar apparatus according to an embodiment of the present invention.

Next, referring to FIGS. 4 and 5, a description will be given of the embodiment in which the basic principle of the self-diagnosis for fault testing of the receiver circuit systems described above is applied to the radar apparatus of FIG. 1. The configuration of the radar apparatus of this embodiment is shown in FIG. 4. As the radar apparatus of the embodiment shown in FIG. 4 employs the same configuration as that of the radar apparatus shown in FIG. 1, the same component parts are designated by the same reference numerals.

In the radar apparatus of the present embodiment, a signal characteristic checking unit 93 is added in the digital signal processing unit 9 in the radar apparatus of FIG. 1. The signal characteristic checking unit 93 operates to control the switching operations of the first selector switch 4 and the second selector switch 7 only when checking the signal characteristics of the receiver circuit systems, and checks for a difference in characteristics between the plurality of receiver circuit systems based on the channel signal outputs of the AD converters 91 and 92 derived from the signal received by the particular antenna. The signal level and/or phase of each channel signal is corrected based on the result of the check.

Further, in the example of the radar apparatus of the present embodiment shown in FIG. 3, adjusters 101 and 102 for adjusting the signal level and/or phase of the respective channel signals are inserted halfway through the respective signal circuit systems between the respective band-pass filter circuits and the respective AD converters and, when the signal characteristics are checked by the signal characteristic checking unit 93, each adjuster adjusts the signal level and/or phase in analog fashion and holds the resulting adjustment value. With this adjustment value, the difference in characteristics between the receiver circuit systems is corrected during the usual recognition process. The adjusters 101 and 102 each include a variable-gain amplifier and a phase shifter, and are each designated as L/P in the figure.

The channel signal adjusting function can be implemented in hardware by inserting the adjusters in the respective receiver circuit systems as shown in FIG. 4 but, alternatively, the A-D converted channel signals may be adjusted by software in the digital signal processing unit 9 so that the difference in characteristics between the receiver circuit systems is corrected accordingly during the usual recognition process. In that case, the correction value for correcting for the difference in characteristics is stored in a storage unit for use in the digital signal processing.

With the above configuration, even when there initially exists a difference in characteristics between the receiver circuit systems or when the difference in characteristics occurs during operation, in the subsequent processing the output signal processed in each receiver circuit system is automatically corrected in accordance with the thus held or stored correction value; therefore, in the usual recognition process, the difference in characteristics between the receiver circuit systems is already eliminated. In the case of a radar apparatus equipped with three or more receiving antennas, the above technique is repeated by sequentially combining two receiver circuit systems, one associated with the particular antenna and the other associated with the other receiving antenna; in this way, the difference in characteristics between each receiver circuit system can be corrected for all the receiver circuit systems, and uniform characteristics can be obtained as a whole.

Next, referring to the flowchart of FIG. 5, a description will be given of an actual correction procedure that the signal characteristic checking unit 93 contained in the digital signal processing unit 9 performs in accordance with the above-described method that eliminates any differences in characteristics between the receiver circuit systems by checking for differences in the characteristics of the channel signals between the receiver circuit systems.

Figure 5:
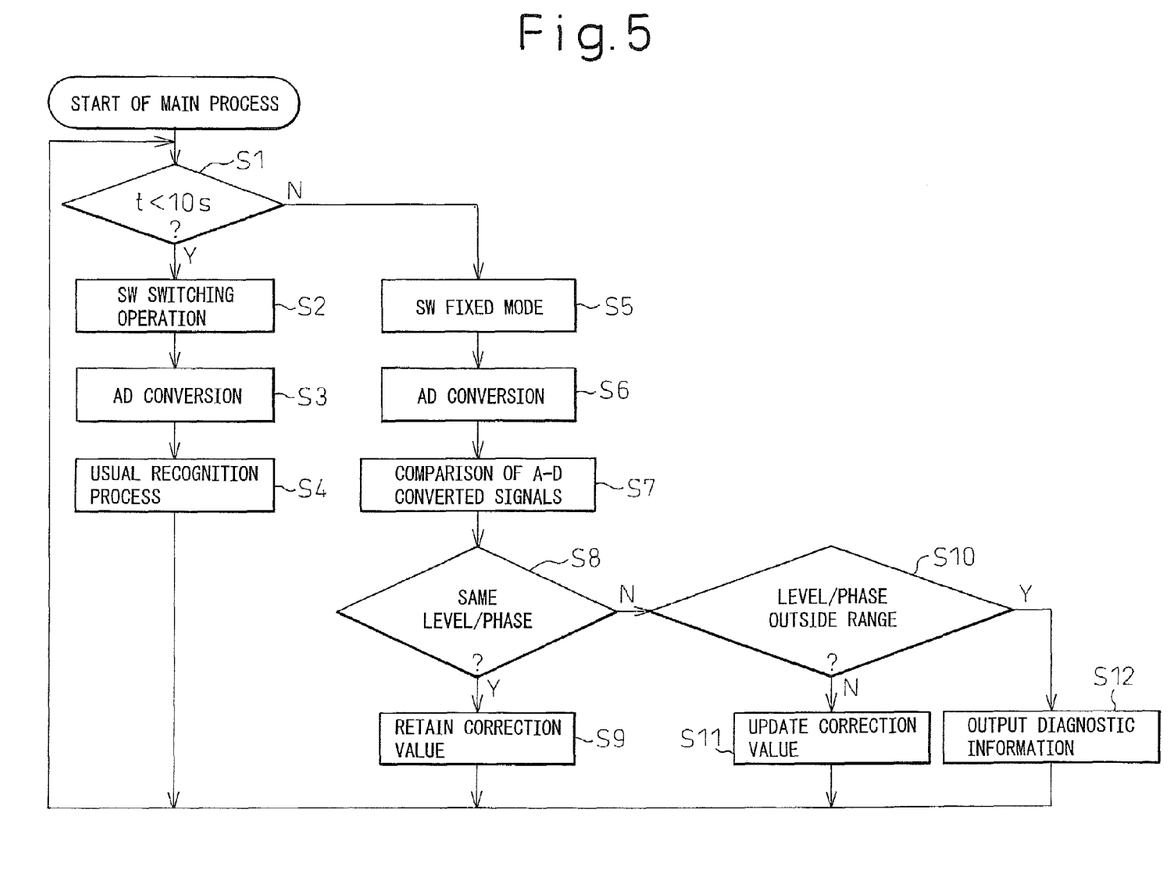
FIG. 5 is a flowchart diagram for explaining a processing procedure for checking signal characteristics in the radar apparatus according to the present invention.

The correction procedure shown in FIG. 5 is given by taking the radar apparatus of FIG. 4 as an example. First, in the digital signal processing unit 9, when the usual recognition process, i.e., the main process of the processor, is initiated, the signal characteristic checking unit 93 is activated. The signal characteristic checking unit 93 has a timer; upon activation of the checking unit, the timer starts, and it is determined whether a prescribed time, for example, 10 seconds, has elapsed or not (step S1).

If 10 seconds have not yet elapsed (Y in step S1), the digital signal processing unit 9 proceeds to perform the usual recognition process, and controls the switching operations of the first switch 4 and the second switch 7 in synchronized fashion (step S2).

Then, in the digital signal processing unit 9, the channel signals ch1 and ch2 output from the band-pass filters 81 and 82 are A-D converted (step S3), and next, FFT processing is applied to perform the usual recognition process such as azimuth detection (step 4). After that, the process returns to step S1, and the digital signal processing unit 9 continues to perform the usual recognition process until the 10-second period elapses.

On the other hand, when it is determined that the 10-second period has elapsed (N in step S1), the signal characteristic checking unit 93 controls the first switch 4 to select either one of the receiving antennas AR1 and AR2 as the particular antenna and hold the selected antenna in an ON condition (step S5). In FIG. 4, the receiving antenna AR1 is selected as the particular antenna, so that the channel signal ch1 received by the receiving antenna AR1 serves as a reference for comparison.

Next, the signal characteristic checking unit 93 controls the switching operation of the second switch to generate the channel signals ch11 and ch12 from the channel signal ch1 and direct them to the respective band-pass filter circuits 81 and 82 whose outputs are then converted into digital form by the respective AD converters 91 and 92 (step S6).

Here, the signal characteristic checking unit 93 compares the A-D converted signal of the channel signal ch11 with the A-D converted signal of the channel signal ch12 (step S7). In this step, the difference in signal level and/or phase between the channel signals ch11 and ch12 is checked based on the A-D converted signals, and the amount of difference is computed. The amount of difference is used as the correction value for correcting for the difference in the characteristics.

Next, based on the amount of difference thus computed, it is determined whether the signal level and/or the phase are the same between the channel signals ch11 and ch12 (step S8).

If it is determined here that the signal level and/or the phase are not the same between them (Y in step S8), the probability is that there may have initially been a difference in characteristics between the receiver circuit systems in the manufacturing process but the difference has already been corrected, or that the performance deterioration of the receiver circuit systems has not progressed much; therefore, by determining that there is no difference in characteristics between the receiver circuit systems, the correction value already obtained and set in the previous cycle of the correction process is retained as is (step S9). Then, the process returns to step S1, and the digital signal processing unit 9 continues to perform the usual recognition process.

On the other hand, if it is determined that the signal level and/or the phase are not the same between the two signals (N in step S8), it is further determined whether the signal level value and/or the phase value are outside a predetermined range (step S10). This determination is made primarily to check the fault state of the receiver circuit system.

If the signal level value and/or the phase value are within the predetermined range (N in step S10), the probability is that the performance deterioration of the receiver circuit systems has progressed, or that the characteristics have varied due to temperature variations in the operating environment; therefore, the correction value is generated based on the amount of difference computed in step A7, and the correction value already obtained and set in the previous cycle of the correction process is updated with the correction value obtained in the current cycle of the correction process (step S11). Then, the process returns to step S1, and the digital signal processing unit 9 continues to perform the usual recognition process. Here, when the correction value is updated, a notification may be produced externally to indicate that a change has occurred in the characteristics of the receiver circuit system.

On the other hand, if the signal level value and/or the phase value are outside the predetermined range (Y in step S10), this means that the receiver circuit system is in a faulty condition which can have a series effect on the usual recognition process being performed by the digital signal processing unit 9; therefore, in this case, diagnostic information is output to indicate the failure of the receiver circuit system (step S12).

For example, provisions may be made to carry out the process for checking for a change in the characteristics of each receiver circuit system in the event of the occurrence of an abrupt change that would never be encountered in the normal recognition process; then, the occurrence of an abrupt fault in any one of the receiver circuit systems can be automatically detected, and a notification can be reliably output to indicate that the recognition done by the radar apparatus is wrong. In step S12, the diagnostic information is output, for example, to an electronic control unit (ECU) that performs processing for navigation, an automatic cruise control (ACC) unit, etc.

As described above, by controlling the switching operations of the first switch 4 and the second switch 7, the signal characteristic checking unit 93 generates the channel signals ch11 and ch12 based on the channel signal ch1 received by the particular antenna, and thus supplies the same channel signal to each receiver circuit system. Using these channel signals having the same characteristics, the processing results of the respective receiver circuit systems can be compared with each other. Accordingly, even when a change has occurred in the characteristics of any one of the receiver circuit systems or there is variation in the characteristics of each receiver circuit system, the characteristics can be corrected by the correction value obtained for that receiver circuit system so that such a change or variation does not affect the usual recognition process.

In the configuration where the adjusters 101 and 102 are inserted in the respective receiver circuit systems, the signal characteristic checking unit 93 controls the respective adjusters to correct the characteristics of the receiver circuit systems; here, there can occur cases where it becomes necessary to check whether the adjusting functions of the adjusters are working properly. In such cases, if the variable-gain amplifier contained in each adjuster is of the type that is controlled ON/OFF for adjustment, then it can be determined whether the adjusting function of each adjuster is working properly by comparing the ON/OFF control conditions between the respective receiver circuit systems. If there is any difference in the ON/OFF control conditions between the respective receiver circuit systems, the difference can be adjusted.

The above has described with reference to the flowchart of FIG. 5 how the signal characteristic checking unit contained in the digital signal processing unit checks for a difference in the characteristics of the channel signals between the receiver circuit systems and performs correction so as to eliminate the difference in characteristics between the receiver circuit systems. Now, a specific example of how the correction value is calculated in the above correction process will be described below.

In the example of the correction value calculation described here, the two A-D converted received signals of the channels ch11 and ch12, derived from the received signals of the channel ch1, are used. The respective received signals are denoted by $E_1(t)$ and $E_2(t)$, and it is assumed that each received signal is obtained only from a reflected wave returned from a known target. Then, the respective received signals are expressed as $$E_1(t) = C_1 \cdot e^{-j2\pi ft} = C_1 \cdot e^{-j\theta_1(t)}$$

$$E_2(t) = C_2 \cdot e^{-j(2\pi ft - \delta)} = C_2 \cdot e^{-j\theta_2(t)}$$

where $C_1$ and $C_2$ represent the amplitudes, and $\theta_1(t)$ and $\theta_2(t)$ the phases. Here, $\theta_2(t) = 2\pi ft - \delta$, which indicates that the received signal $E_2(t)$ has a phase shift $\delta$ with respect to the received signal $E_1(t)$.

It is assumed here that, when there is a difference between the characteristics of the respective receiver circuit systems, the amplitudes and phases of the normally received signals have the relations $C_1 \neq C_2$ and $\theta_1 \neq \theta_2$, respectively. On the other hand, when there is no difference between the characteristics of the respective receiver circuit systems, the relations $C_1 = C_2$ and $\theta_1 = \theta_2$ hold, so that the received signal of the channel ch11 and that of the channel ch12 should be identical to each other.

By utilizing this principle, the characteristics of each receiver circuit system are corrected so that the received signals "ch11" and "ch12" become identical to each other; that is, when the amplitude correction value is denoted by k and the phase shift correction value by $\delta$, the amplitudes $C_1$ and $C_2$ and the phases $\theta_1$ and $\theta_2$ are respectively related by $$C_1 = kC_2 \text{ and}$$

$$\theta_1 = \theta_2 + \delta$$

Then, when the corrected received signal of the channel ch12 is denoted by $E_2'(t)$, $E_2'(t)$ is given by $$E_2'(t) = kC_2 \cdot e^{-j\{\theta_2(t) + \delta\}}$$

Here, from the above relations $C_1 = kC_2$ and $\theta_1 = \theta_2 + \delta$, $E_2'(t)$ can be expressed as $$E_2'(t) \approx C_1 \cdot e^{-j2\pi ft} = E_1$$

This means that the received signal of the channel ch12 has been corrected by the correction values k and δ so that it becomes identical to the received signal of the channel ch11.

In this way, either one of the received signals of the two channels is corrected based on the correction values k and δ by reference to the other received signal. Then, in step S6 in the flowchart of FIG. 5, an FFT is applied to each A-D converted received signal and, in step S7, the amplitude values $C_1$ and $C_2$ and the phase values $\theta_1$ and $\theta_2$ are computed from the results of the FFTs by finding the real and imaginary roots of the frequency associated with the distance/position of the known target.

Once the amplitude values $C_1$ and $C_2$ and the phase values $\theta_1$ and $\theta_2$ are computed, the correction values k and δ for the channels ch11 and ch12 can be obtained from the relations $C_1 = kC_2$ and $\theta_1 = \theta_2 + \delta$ given above.

The above description has been given by dealing with the case where the correction values k and δ are obtained for the channels ch11 and ch12 derived from the channel ch1 but, when the receiving side comprises two antennas AR1 and AR2, as in the radar apparatus shown in FIG. 1, the antenna AR2 may be fixedly connected and the received signals of channels ch21 and ch22 may be derived from the channel ch2; in this case also, the correction values k and δ for the channels ch21 and ch22 can be obtained in a manner similar to that described in the above correction process. Further, by comparing the two sets of correction values thus obtained, the difference between the characteristics of the respective antennas AR1 and AR2 can be obtained.

Further, in the case of a multi-channel radar apparatus equipped with a larger number of receiving antennas and a corresponding number of receiver circuit systems, one of the receiving antennas is fixedly connected, and the signal received by the thus connected receiving antenna is supplied to the respective circuit systems to generate a plurality of channels ch1 to chm. Then, combinations of two channels are sequentially selected by combining the reference channel, for example, the channel ch1, with another channel selected from among the plurality of channels; in this way, the correction values k and δ can be obtained for each two-channel combination.

The flowchart of FIG. 5 has described how the signal characteristic checking unit 93 checks for a change in the characteristics of each receiver circuit system, and how a correction is made when a change is detected in the characteristics. In the flowchart, the process for checking for a change in the characteristics of each receiver circuit system has been described as being carried out at predetermined intervals of time preset by the timer, for example, at intervals of 10 seconds, during the normal recognition process being performed by the digital signal processing unit 9. Next, a description will be given of other cases where the process for checking for a change in the characteristics of each receiver circuit system can be carried out.

The process for checking for a change in the characteristics of each receiver circuit system may be carried out at a desired time by sending a processing instruction to the signal characteristic checking unit 93 from outside the radar apparatus. This can be employed, for example, at the factory, when an inspector issues the instruction to ensure uniform product quality at the time of product inspection before shipment. Further, the user of the radar apparatus may issue the processing instruction as needed in order to enhance the accuracy of the recognition operation of the radar apparatus.

On the other hand, in applications where, for example, the radar apparatus is mounted on a vehicle and is operated when the vehicle is traveling, the signal characteristic checking unit 93 may be set up to activate the process intermittently and automatically and apply a correction as needed during the usual recognition process in the radar apparatus. In the example of FIG. 5, the correction process has been carried out at predetermined intervals of time preset by the timer, but alternatively, the correction process may be carried out once every predetermined cycles of the usual recognition process.

Further, provisions may be made to detect vehicle speed from the vehicle's speedometer or the like and to perform the receiver circuit system correction process when the vehicle is stationary. Here, when the vehicle speed is not zero, and the vehicle is therefore moving, the radar apparatus is allowed to continue to perform the usual recognition process, but when the vehicle is stationary, and the vehicle speed is therefore zero, the correction value is computed in accordance with the correction procedure described above, and the correction operation is performed to update the correction value or the previous correction value is retained as is. Further, if the computed correction value is outside the predetermined range, the diagnostic information is output.

The correction process is carried out only when the vehicle is stationary; that is, when the vehicle is stationary, because the distance to the target located ahead of the vehicle is fixed, the input of the received signal is stable and an improvement in the accuracy of the correction operation can therefore be expected. It will, however, be appreciated that the object of the present invention can also be achieved if the correction process is simply carried out periodically, once for every predetermined number of processing cycles, regardless of whether the vehicle is stationary or not.

When the vehicle is stationary, the input of the received signal is stable, and therefore, the process for checking for a change in the characteristics of each receiver circuit system can be performed in a reliable manner, which in turn means that the process can be carried out when the channel signals input to the respective receiver circuit systems are stable, regardless of whether the vehicle is stationary or not; therefore, the process may be carried out even when the vehicle is moving, provided that the relative distance to the target located ahead of the vehicle is constant or that the reception level is high.

In the explanation so far given, the process for checking for a change in the characteristics of each receiver circuit system has been described as being carried out primarily in accordance with temporal conditions, but the process for checking for a change in the characteristics of each receiver circuit system may be carried out when a temperature change occurs in the operating environment of the radar apparatus. For example, a temperature sensor is mounted directly on or in the vicinity of the radar apparatus, and the ambient temperature of the receiver circuit systems is detected by this sensor. The performance and the processing characteristics of the receiver circuit systems change with temperature, and the degree of the change varies among the receiver circuit systems.

Accordingly, based on the temperature information supplied from the temperature sensor, the signal characteristic checking unit 93 carries out the process for checking for a change in the characteristics of each receiver circuit system, for example, when the detected temperature is outside a predetermined range. By detecting the temperature information in this way, the correction operation is performed accurately as the environment of the radar apparatus changes. When the correction operation responding to a change in the environment is combined with the earlier described intermittent correction operation, the accuracy of the correction process can be further enhanced.

The embodiment of the radar apparatus according to the present invention described above is based on the radar apparatus configuration shown in FIG. 1, and the radar apparatus is equipped with an array antenna having a plurality of antennas. The array antenna includes, for example, a transmitting antenna AT and receiving antennas AR1 and AR2.

The embodiment of the radar apparatus according to the present invention described above is applicable not only to the array antenna configuration comprising a transmit-only antenna and a plurality of receive-only antennas, but also to the array antenna configuration only comprising a plurality of transmit-receive common antennas. An example in which the array antenna is constructed from a plurality of transmit-receive common antennas will be described below with reference to FIG. 6 which shows an alternative embodiment of the radar apparatus according to the present invention.

Figure 6:
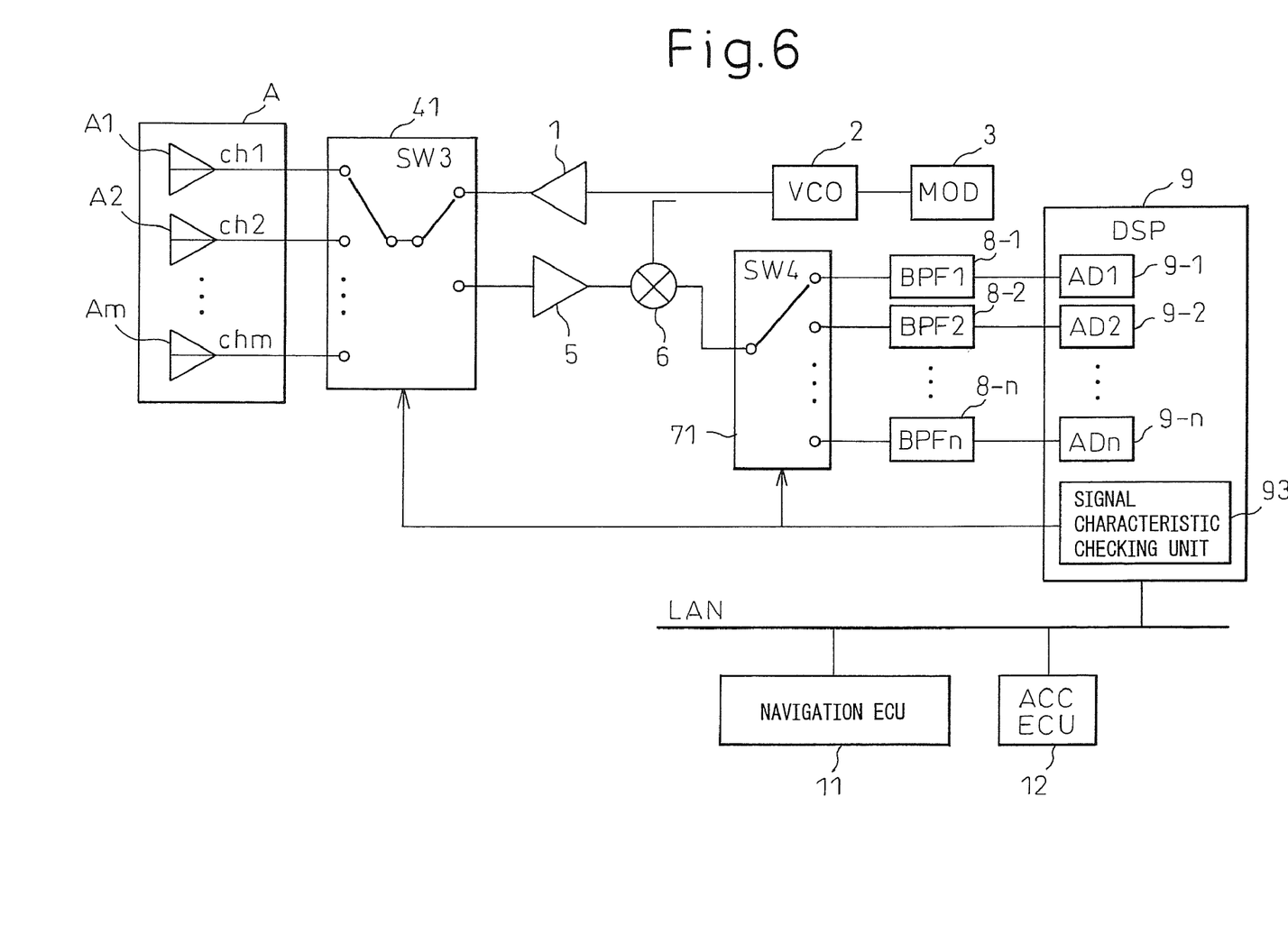
FIG. 6 is a diagram for explaining the configuration of a radar apparatus according to an alternative embodiment of the present invention.

The DBF FW-CW radar apparatus according to the alternative embodiment shown in FIG. 6 is based on the radar apparatus configuration of the embodiment shown in FIG. 4, but this alternative embodiment employs an antenna array A comprising a plurality of transmit-receive common antennas Al to Am, not the array antenna configuration comprising a combination of a transmit-only antenna and a plurality of receive-only antennas.

The radar apparatus shown here comprises, in addition to the array antenna A, an amplifier 1, a voltage-controlled oscillator 2 designated as VCO, and a modulating signal generator 3 designated as MOD, which together constitute the transmitter unit.

The radar apparatus further comprises a third switch 41, designated as SW3, for selectively connecting the antennas A1 to Am in the array antenna one at a time to the amplifier 1 during transmission, and for selectively connecting the respective antennas one at a time to the amplifier 5 during reception. The radar apparatus also includes: a mixer 6 for mixing the received signal with a portion of the transmitter signal; and a fourth switch 71, designated as SW4, for directing the mixed signal to a selected one of band-pass filters 8-1 to 8-n designated as BP1 to BPn. There are also included AD converters 9-1 and 9-n, designated as AD1 to ADn, to which the outputs of the respective band-pass filters 8-1 to 8-n are coupled, the AD converters 9-1 to 9-n being contained in a digital signal processing unit 9 designated as DSP.

The amplifier 5 and the mixer 6 together constitute the downconverting unit, and the band-pass filters 8-1 to 8-n and the AD converters 9-1 to 9-n together constitute the receiver circuit unit. In the receiver circuit unit, a plurality of receiver circuit systems each comprising one band-pass filter circuit paired with one AD converter are provided to correspond with the number of receiving antennas, and these receiver circuit systems are selectively switched into connection one at a time by the fourth switch 71.

In the radar apparatus of the alternative embodiment shown in FIG. 6, as in the radar apparatus shown in FIG. 4, the signal characteristic checking unit 93 is incorporated in the digital signal processing unit 9 of the radar apparatus. The signal characteristic checking unit 93 operates to control the switching operations of the third switch 41 and the fourth switch 71 only when checking the signal characteristics of the receiver circuit systems, and checks for a difference in characteristics between the plurality of receiver circuit systems based on the channel signal outputs of the AD converters 9-1 to 9-n derived from the signal received by the particular antenna. The signal level and/or phase of each channel signal is corrected based on the result of the check.

Further, in the radar apparatus of the alternative embodiment shown in FIG. 6, an adjuster comprising a variable-gain amplifier and a phase shifter may be inserted halfway through each signal circuit system between the band-pass filter circuit and the AD converter in order to adjust the signal level and/or phase of the channel signal, as in the radar apparatus of the foregoing embodiment, or provisions may be made in the digital signal processing unit 9 to adjust the A-D converted channel signals by software so that the difference in characteristics between the receiver circuit systems is corrected accordingly during the usual recognition process.

Next, a description will be given of a procedure for checking for a difference in characteristics between the receiver circuit systems and correcting for the difference in the radar apparatus of the alternative embodiment shown in FIG. 6. The method of eliminating the difference in characteristics between the receiver circuit systems and the method of calculating the correction value in the correction procedure are the same as those employed in the foregoing embodiment.

First, in the digital signal processing unit 9, when the usual recognition process, i.e., the main process of the processor, is initiated, the signal characteristic checking unit 93 is activated. The timer incorporated in the signal characteristic checking unit 93 starts to operate, and the digital signal processing unit 9 performs the usual recognition process until a prescribed time elapses. The third switch 41 and the fourth switch 71 are controlled.

Next, when the prescribed time has elapsed, the signal characteristic checking unit 93 controls the third switch 41 so that the antenna A1, for example, is connected to the amplifier 1 and is thus set as the transmitting antenna, as shown in FIG. 6. In FIG. 6, the antenna A1 is selected as the particular antenna, so that the channel signal ch1 received by the antenna A1 serves as a reference for comparison.

Next, the signal characteristic checking unit 93 controls the third switch 41 to connect the antenna A1 to the amplifier 5, and also controls the fourth switch to generate the channel signals ch11 and ch12 from the channel signal ch1 and direct them to the respective band-pass filter circuits 8-1 and 8-2 whose outputs are then converted into digital form by the respective AD converters 9-1 and 9-2.

Here, the signal characteristic checking unit 93 compares the A-D converted signal of the channel signal ch11 with the A-D converted signal of the channel signal ch12. At this time, the difference in signal level and/or phase between the channel signals ch11 and ch12 is checked based on the A-D converted signals, and the amount of difference is computed. The amount of difference is used as the correction value for correcting for the difference in characteristics between the receiver circuit systems.

Next, based on the amount of difference thus computed, it is determined whether the signal level and/or the phase are the same between the channel signals ch11 and ch12; if it is determined that the signal level and/or the phase are not the same between them, this means that the difference has already been corrected, or that the performance deterioration of the receiver circuit systems has not progressed much. Therefore, by determining that there is no difference in characteristics between the receiver circuit systems, the previously set correction value is retained as is, and the digital signal processing unit 9 continues to perform the usual recognition process.

On the other hand, if it is determined that the signal level and/or the phase are not the same between the two signals, then to check the fault state of the receiver circuit system it is further determined whether the signal level value and/or the phase value are outside a predetermined range; if the signal level value and/or the phase value are within the predetermined range, this means that the performance deterioration of the receiver circuit systems has progressed, or that the characteristics have varied due to temperature variations in the operating environment; therefore, the correction value is generated based on the amount of difference computed above, and the previously set correction value is updated with the thus generated correction value.

Then, the digital signal processing unit 9 continues to perform the usual recognition process. Here, when the correction value is updated, a notification may be produced externally to indicate that a change has occurred in the characteristics of the receiver circuit system.

On the other hand, if the signal level value and/or the phase value are outside the predetermined range, this means that the receiver circuit system is in a faulty condition. Since this can have a series effect on the usual recognition process being performed by the digital signal processing unit 9, diagnostic information is output to indicate the failure of the receiver circuit system.

Here, in an environment where the digital signal processing unit 9 is connected to a network such as a vehicle LAN or CAN, for example, the diagnostic information is output to a navigation processing ECU 11, an ACC ECU 12, etc. as shown in FIG. 6, and the digital signal processing unit 9 sends the diagnostic information to these output destinations.

As described above, by controlling the switching operations of the third switch 41 and the fourth switch 71, the signal characteristic checking unit 93 generates the channel signals ch11 and ch12 based on the channel signal ch1 received by the particular antenna, and thus supplies the same channel signal to each receiver circuit system. Using these channel signals having the same characteristics, the processing results of the respective receiver circuit systems can be compared with each other. Accordingly, even when a change has occurred in the characteristics of any one of the receiver circuit systems or there is variation in the characteristics of each receiver circuit system, the characteristics can be corrected by the correction value obtained for that receiver circuit system so that such a change or variation does not affect the usual recognition process.

What is claimed is:

1. A radar apparatus comprising:
    a transmitter unit which radiates a transmitter signal;
    a plurality of antennas each of which receives a reflected wave produced by a reflection of said transmitter signal off an object;
    a first switch unit which connects output terminals of said plurality of antennas in sequence and one at a time to an input terminal;
    a downconverting unit which, by using a portion of said transmitter signal, downconverts a received signal input from said antenna connected to said input terminal of said first switch unit;
    a second switch unit which connects an output of said downconverting unit to a selected one of first to nth filter circuits;
    a digital signal processing unit inputting each output of said first to nth filter circuits to each of first to nth AD converters corresponding to the first to nth filter circuits, and applying prescribed processing to first to nth output signals output from said first to nth AD converters, and thereby detecting distance or relative velocity with respect to said object; and
    a signal characteristic checking unit which compares two output signals selected from among said first to nth output signals that were output based on said received signal received by a particular antenna selected from among said plurality of antennas, and thereby checks for differences between characteristics of first to nth receiver circuit systems respectively comprised of the filter circuit and the AD converter, based on changes in characteristics of said first to nth output signals, and corrects for any difference in the characteristic of each receiver circuit system;
    wherein said digital processing unit corrects said first to nth output signals with correction values, and detects said distance or relative velocity with respect to said object based on said corrected first to nth output signals.

2. A radar apparatus as claimed in claim 1, wherein said signal characteristic checking unit checks for a change in the characteristics of said first to nth output signals by comparing signal level and/or phase between said two output signals respectively selected from among said first to nth output signals.

3. A radar apparatus as claimed in claim 1, wherein said signal characteristic checking unit selects said particular antenna from among said plurality of antennas by controlling said first switch unit and, from said received signal received by said particular antenna, generates said first to nth output signals by controlling said second switch unit.

4. A radar apparatus as claimed in claim 1, wherein when it is determined that there is a difference in said characteristics, said signal characteristic checking unit corrects for said difference in said characteristics by controlling first to nth adjusters respectively connected to inputs of said first to nth AD converters.

5. A radar apparatus as claimed in claim 4, wherein each of said first to nth adjusters includes a variable-gain amplifier and/or a variable phase shifter which are controlled by said signal characteristic checking unit.

6. A radar apparatus as claimed in claim 3, wherein, when it is determined that there is a difference in said characteristics, said signal characteristic checking unit calculates a correction value for said first to nth output signals in accordance with said difference in said characteristics, and
    said digital signal processing unit corrects said first to nth output signals based on said correction value.

7. A radar apparatus as claimed in claim 6, wherein said signal characteristic checking unit stores said calculated correction values in association with said first to nth output signals in a storing unit, and wherein said digital processing unit performs recognition process for detecting said distance or relative velocity based on said first to nth output signals corrected by said stored correction values.

8. A radar apparatus as claimed in claim 7, wherein said signal characteristic checking unit performs processing to check for a change in said characteristics as an initial adjustment of said apparatus and, if there is a change in said characteristics, then stores said calculated correction value in association with said first to nth output signals.

9. A radar apparatus as claimed in claim 1, wherein said signal characteristic checking unit performs processing to check for a change in said characteristics in an intermittent manner during a recognition process in which said digital signal processing unit detects the distance or relative velocity with respect to said object.

10. A radar apparatus as claimed in claim 7, wherein said signal characteristic checking unit performs processing to check for a change in said characteristics when it is recognized that said distance relative to said object remains unchanged.

11. A radar apparatus as claimed in claim 8, wherein said signal characteristic checking unit performs processing to check for a change in said characteristics when it is recognized that a vehicle equipped with said apparatus is stationary.

12. A radar apparatus as claimed in claim 1, wherein said signal characteristic checking unit performs processing to check for a change in said characteristics when the signal level and/or phase of said first to nth output signals is greater than a predetermined value or lies within a predetermined range.

13. A radar apparatus as claimed in claim 12, wherein said signal characteristic checking unit calculates correction values based on said change in said characteristics, and stores said calculated correction values in association with said first to nth output signals in a storing unit, and wherein said digital processing unit performs recognition process for detecting said distance or relative velocity based on said first to nth output signals corrected by said stored correction values.

14. A radar apparatus as claimed in claim 1, wherein said signal characteristic checking unit performs processing to check for a change in the characteristics of said first to nth output signals in accordance with an external instruction.

15. A radar apparatus as claimed in claim 13, wherein said signal characteristic checking unit performs processing to check for a change in said characteristics as an initial adjustment of said apparatus and, if there is a change in said characteristics, then stores said calculated correction value in association with said first to nth output signals.

16. A radar apparatus as claimed in claim 1, wherein said signal characteristic checking unit produces a notification externally when it is determined that a change has occurred in said characteristics.

17. A radar apparatus as claimed in claim 16, wherein when it is determined that a change has occurred in said characteristics, if said change in said characteristics is not within a predetermined range, said signal characteristic checking unit outputs diagnostic information externally.

* * * * *